United States Patent
Cho et al.

(10) Patent No.: US 12,002,968 B2
(45) Date of Patent: Jun. 4, 2024

(54) METHOD OF MANUFACTURING CATALYST SLURRY FOR FUEL CELLS AND METHOD OF MANUFACTURING ELECTRODE FOR FUEL CELLS USING THE SAME

(71) Applicants: HYUNDAI MOTOR COMPANY, Seoul (KR); KIA MOTORS CORPORATION, Seoul (KR)

(72) Inventors: Yoon Hwan Cho, Seoul (KR); Kook Il Han, Seongnam-si (KR); Su Won Seol, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 304 days.

(21) Appl. No.: 16/901,479

(22) Filed: Jun. 15, 2020

(65) Prior Publication Data
US 2021/0175516 A1 Jun. 10, 2021

(30) Foreign Application Priority Data
Dec. 10, 2019 (KR) .......... 10-2019-0163370

(51) Int. Cl.
| | |
|---|---|
| *H01M 4/92* | (2006.01) |
| *H01M 4/86* | (2006.01) |
| *H01M 4/88* | (2006.01) |
| *H01M 4/90* | (2006.01) |

(52) U.S. Cl.
CPC ......... *H01M 4/926* (2013.01); *H01M 4/8647* (2013.01); *H01M 4/8668* (2013.01); *H01M 4/8814* (2013.01); *H01M 4/8828* (2013.01); *H01M 4/8882* (2013.01); *H01M 4/9041* (2013.01); *H01M 4/9083* (2013.01); *H01M 4/921* (2013.01); *H01M 4/8835* (2013.01)

(58) Field of Classification Search
CPC .......................................... H01M 4/88–4/8896
See application file for complete search history.

(56) References Cited

U.S. PATENT DOCUMENTS

| | | | | |
|---|---|---|---|---|
| 6,074,773 A | * | 6/2000 | Wilkinson .......... | H01M 4/8605 429/491 |
| 2010/0087309 A1 | * | 4/2010 | Kwon ................. | H01M 4/8828 422/128 |
| 2014/0262790 A1 | * | 9/2014 | Levendusky .......... | C25D 11/08 205/112 |
| 2017/0033369 A1 | * | 2/2017 | Burton ................. | H01M 4/928 |

FOREIGN PATENT DOCUMENTS

KR 10-1774706 B1 9/2017

* cited by examiner

*Primary Examiner* — Jonathan Crepeau
(74) *Attorney, Agent, or Firm* — MCDONNELL BOEHNEN HULBERT & BERGHOFF LLP

(57) ABSTRACT

The present disclosure relates to a method of manufacturing catalyst slurry for fuel cells capable of greatly improving efficiency in use of catalyst metal and a method of manufacturing an electrode for fuel cells using the catalyst slurry manufactured using the method. Specifically, the method of manufacturing catalyst slurry for fuel cells includes preparing a catalyst including a porous carrier and catalyst metal, introducing the catalyst, a solvent, and an ionomer into a chamber, and infiltrating the ionomer into pores of the carrier.

13 Claims, 2 Drawing Sheets

METHOD OF MANUFACTURING CATALYST SLURRY FOR FUEL CELLS AND METHOD OF MANUFACTURING ELECTRODE FOR FUEL CELLS USING THE SAME

CROSS REFERENCE TO RELATED APPLICATIONS

This application claims, under 35 U.S.C. § 119(a), the benefit of priority to Korean Patent Application No. 10-2019-0163370 filed on Dec. 10, 2019, the entire contents of which are incorporated herein by reference.

BACKGROUND

(a) Technical Field

The present disclosure relates to a method of manufacturing catalyst slurry for fuel cells capable of greatly improving efficiency in use of catalyst metal and a method of manufacturing an electrode for fuel cells using the catalyst slurry manufactured using the method.

(b) Background Art

In the case in which catalyst metal, such as platinum (Pt), is used alone as a catalyst for fuel cells, performance of the catalyst is low compared to the amount of the catalyst that is used, and efficiency of the catalyst is reduced due to the thickness of an electrode and distribution of pores in the electrode. Consequently, the catalyst metal is used in the state of being supported by carbon or metal oxide.

In order to increase the loading amount of the catalyst metal, generally, pores are formed in a carrier, such as the carbon or the metal oxide, to increase the specific surface area of the carrier.

However, in the case in which the catalyst is used as a catalyst for an electrode of a fuel cell in the state in which the catalyst metal is coupled to the porous carrier, as described above, the catalyst metal present in the pores of the carrier does not contact an ionomer, whereby a region in which it is not possible to use the catalyst metal may be formed. In this case, efficiency of the catalyst compared to the amount of the catalyst that is used falls short of an expected value.

The above information disclosed in this Background section is provided only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

It is an object of the present disclosure to provide a method of manufacturing catalyst slurry for fuel cells capable of greatly improving efficiency in use of catalyst metal.

The objects of the present disclosure are not limited to those described above. The objects of the present disclosure will be clearly understood from the following description and could be implemented by means defined in the claims and a combination thereof.

In one aspect, the present disclosure provides a method of manufacturing catalyst slurry for fuel cells, the method including preparing a catalyst including a porous carrier and catalyst metal, introducing the catalyst, a solvent, and an ionomer into a chamber, and infiltrating the ionomer into pores of the carrier.

The carrier may include one selected from the group consisting of graphite, active carbon, carbon black, carbon nanotube, carbon nanofiber, carbon nanowire, and a combination thereof.

The carrier may include pores depressed inwards from the outer surface thereof by a predetermined depth, and the pores may include pore inlets having an average diameter of 5 nm to 30 nm.

The catalyst metal may include platinum (Pt) or at least one or an alloy of two or more selected from the group of platinum (Pt), iridium (Ir), ruthenium (Ru), palladium (Pd), nickel (Ni), cobalt (Co), and yttrium (Y).

The catalyst may be introduced into the chamber, negative pressure may be applied to the chamber, and the solvent and the ionomer may be introduced into the chamber together with inert gas.

The solvent may include one selected from the group consisting of distilled water, ethanol, propanol, butanol, ethylene glycol, and a combination thereof.

The ionomer may include: a fluorine-based resin including a single polymer, a cross-linking polymer, a graft polymer, a copolymer, or a blend of one or more selected from a group consisting of perfluorosulfonic acid and perfluorocarboxylic acid; a non-fluorine-based resin including a single polymer, a cross-linking polymer, a graft polymer, a copolymer, or a blend of one or more selected from a group consisting of polyarylene ether, polyether ketone, polyether ether ketone, polyether sulfone, polyether ether sulfone, polyazole, polyvinyl alcohol, polyphenylene oxide, polyphenylene sulfide, polysulfone, polycarbonate, polystyrene, polyimide, polyamide, polyquinoxaline, and polybenzimidazole; and a combination thereof.

The ionomer may include a polymer having a radius of gyration of a polymer chain of 5 nm or less.

The infiltrating of the ionomer into pores of the carrier may include stirring contents of the chamber while applying at least one of heat or pressure thereto.

The temperature of the contents of the chamber may be increased to 25° C. to 80° C.

The pressure applied to the contents of the chamber may be 2 bar to 200 bar.

Inert gas may be introduced into the chamber in order to apply the pressure to the contents of the chamber.

The contents of the chamber may be stirred for 24 hours to 48 hours.

The catalyst metal may be coupled to the outer surface of the carrier and to the inner surface of each of the pores, and the ionomer may be infiltrated into the pores of the carrier and may contact catalyst metal coupled to the inner surface of each of the pores of the carrier.

In another aspect, the present disclosure provides a method of manufacturing an electrode for fuel cells including coating the catalyst slurry on a substrate to manufacture the electrode.

The substrate may be release paper including one selected from the group consisting of polyethylene naphthalate (PEN), polyethylene terephthalate (PET), polytetrafluoroethylene (PTFE), and a combination thereof.

The catalyst slurry may be coated using a screen printing method, a spray coating method, a coating method using a doctor blade, a gravure coating method, a deep coating method, a silk screen method, a painting method, or a coating method using a slot die.

The method may further include drying the electrode at 100° C. to 200° C. for 5 minutes to 24 hours.

BRIEF DESCRIPTION OF THE FIGURES

The above and other features of the present disclosure will now be described in detail with reference to certain exemplary embodiments thereof illustrated in the accompanying drawings which are given herein below by way of illustration only, and thus are not limitative of the present disclosure, and wherein.

Figure 1:
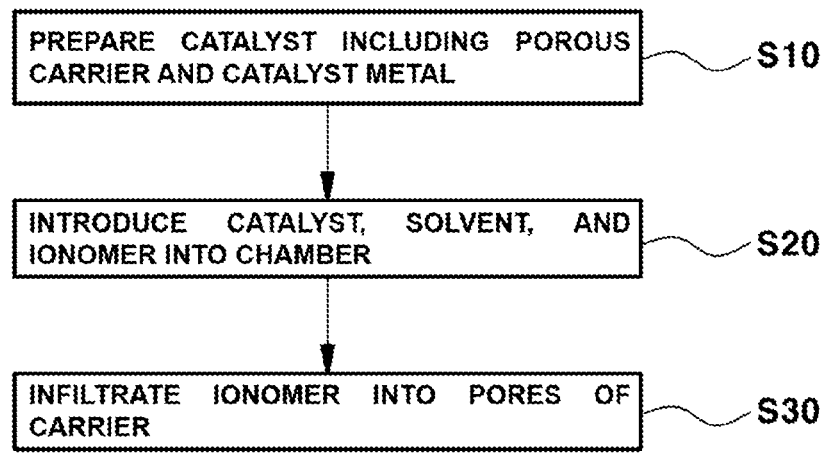
FIG. 1 is a flow chart showing a method of manufacturing catalyst slurry for fuel cells according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The objects described above, and other objects, features and advantages will be clearly understood from the following preferred embodiments with reference to the attached drawings. However, the present disclosure is not limited to the embodiments and will be embodied in different forms. The embodiments are suggested only to offer thorough and complete understanding of the disclosed contents and sufficiently inform those skilled in the art of the technical concept of the present disclosure.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

FIG. 1 is a flowchart showing a method of manufacturing catalyst slurry for fuel cells according to the present disclosure. Referring to this, the method includes preparing a catalyst including a porous carrier and catalyst metal (S10), introducing the catalyst, a solvent, and an ionomer into a chamber (S20), and infiltrating the ionomer into pores of the carrier (S30).

Figure 2:
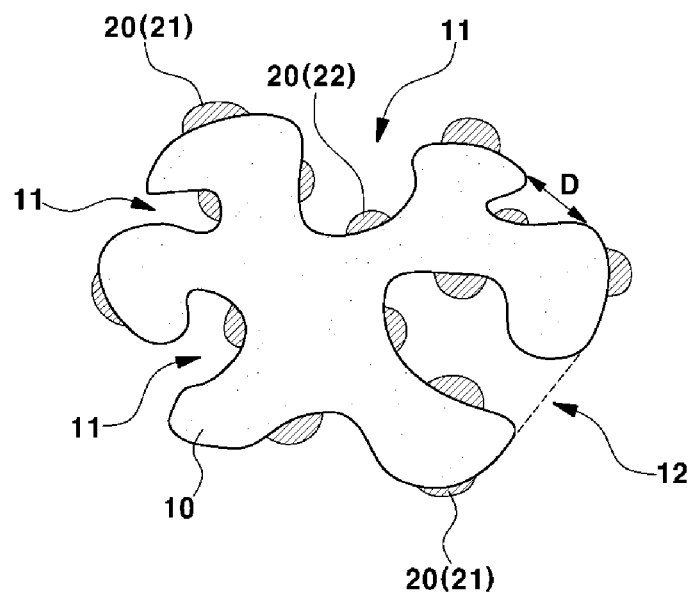
FIG. 2 is a sectional view schematically showing a catalyst according to the present disclosure.

FIG. 2 is a sectional view schematically showing the catalyst. Referring to this, the catalyst includes a porous carrier 10 including pores 11 and catalyst metal 20. In this case, the catalyst metal 20 includes catalyst metal 21 coupled to the outer surface of the carrier 10 and catalyst metal 22 coupled to the inner surface of each of the pores 11.

The kind of the carrier 10 is not particularly restricted as long as the carrier 10 is porous, as shown in FIG. 2. For example, the carrier 10 may include one selected from the group consisting of graphite, active carbon, carbon black, carbon nanotube, carbon nanofiber, carbon nanowire, and a combination thereof.

The carbon black may include one selected from the group consisting of Ketjen black, acetylene black, furnace black, channel black, and a combination thereof.

The carrier 10 includes pores 11 depressed inwards from the outer surface thereof by a predetermined depth. Consequently, each of the pores 11 includes a pore inlet 12, at which the pore joins the outer surface of the carrier 10, and an inner space defined therein.

The average diameter of the pore inlets 12 is not particularly restricted. However, in the present disclosure, the average diameter D of the pore inlets 12 is 5 nm to 30 nm such that an ionomer can easily be infiltrated into the pores 11. Hereinafter, the term "pores" refers to pores configured such that the average diameter D of the pore inlets 12 is 5 nm to 30 nm, which, however, is defined for convenience of description. The pores 11 according to the present disclosure should not be interpreted as having the pore inlets 12 within the above range of sizes.

In addition, the average diameter of the inner spaces of the pores 12 may be 5 nm to 30 nm.

The catalyst metal 20 may include platinum (Pt) or at least one or an alloy of two or more selected from the group of platinum (Pt), iridium (Ir), ruthenium (Ru), palladium (Pd), nickel (Ni), cobalt (Co), and yttrium (Y).

The above catalyst is prepared, and the catalyst, a solvent, and an ionomer are introduced into a chamber (S20).

At this time, in the present disclosure, in order to infiltrate the ionomer into the pores 11 of the catalyst, as previously described, the catalyst is introduced into the chamber, and negative pressure is applied to the chamber to remove gas from the pores 11 and the chamber. After the gas is removed from the pores 11 and the chamber, a solvent and an ionomer are introduced into the chamber together with inert gas, such as argon.

The solvent is not particularly restricted. For example, the solvent may include one selected from the group consisting of distilled water, ethanol, propanol, butanol, ethylene glycol, and a combination thereof.

The kind of the ionomer is not particularly restricted. For example, the ionomer may include: a fluorine-based resin including a single polymer, a cross-linking polymer, a graft polymer, a copolymer, or a blend of one or more selected from the group consisting of perfluorosulfonic acid and perfluorocarboxylic acid; a non-fluorine-based resin including a single polymer, a cross-linking polymer, a graft polymer, a copolymer, or a blend of one or more selected from the group consisting of polyarylene ether, polyether ketone, polyether ether ketone, polyether sulfone, polyether ether sulfone, polyazole, polyvinyl alcohol, polyphenylene oxide, polyphenylene sulfide, polysulfone, polycarbonate, polystyrene, polyimide, polyamide, polyquinoxaline, and polybenzimidazole; and a combination thereof.

In one embodiment of the present disclosure, a polymer having a radius of gyration of a polymer chain of 5 nm or less is used as the ionomer in order to infiltrate the ionomer into the pores 11 of the catalyst. The polymer chain has the form of a chain in a stationary state. Since the polymer chain rapidly moves without a break over time, however, the average form of the polymer chain is a sphere or an ellipsoid. In this case, the radius of gyration of the sphere or the ellipsoid is referred to as the "radius of gyration of a polymer chain." If the radius of gyration of the polymer chain of the ionomer exceeds 5 nm, it may be difficult for the ionomer to be infiltrated into the pores 11. Particularly, in the case in which the pores 11 have pore inlets 12 having an average diameter D of 5 nm to 30 nm, it may be further difficult for the ionomer to be infiltrated into the pores 11. In the present disclosure, an ionomer having a radius of gyration of a polymer chain smaller than the average diameter D of the pore inlets 12 is used.

The catalyst, the solvent, and the ionomer are introduced into the chamber, and the ionomer is infiltrated into the pores 11 of the carrier 10 (S30). Specifically, the contents of the chamber are stirred while heat and pressure are applied to the contents, whereby the ionomer is infiltrated into the pores 11.

Heat may be applied to the chamber in order to increase the temperature of the contents of the chamber to 25° C. to 80 ° C., 50° C. to 80° C., or 60° C. to 80° C.

In addition, inert gas, such as nitrogen or argon, may be introduced into the chamber such that the pressure applied to the contents of the chamber becomes 2 bar to 200 bar, 50 bar to 200 bar, or 100 bar to 200 bar.

The temperature of the contents of the chamber and the pressure applied thereto may be detected by a temperature sensor in the chamber.

In addition, the contents of the chamber may be stirred for 24 hours to 48 hours or 36 hours to 48 hours.

According to an embodiment of the present disclosure, in manufacturing the catalyst slurry including the catalyst, the solvent, and the ionomer, heat and pressure are applied to the components under the above conditions when the components are stirred after being introduced into the chamber such that the ionomer is infiltrated into the pores 11 of the carrier 10 included in the catalyst.

In brief, in one embodiment of the present disclosure, the catalyst slurry is manufactured using the following method in order to infiltrate the ionomer into the pores 11.

First, the catalyst is introduced into the chamber, and negative pressure is applied to the chamber in order to remove gas from the pores of the carrier 10.

In addition, a polymer having a radius of gyration of a polymer chain smaller than the average diameter of the pore inlets of the pores 11, specifically a polymer having a radius of gyration of a polymer chain of 5 nm or less, is used as the ionomer.

In addition, the catalyst, the solvent, and the ionomer are stirred at specific ranges of temperature and pressure.

Figure 3A:
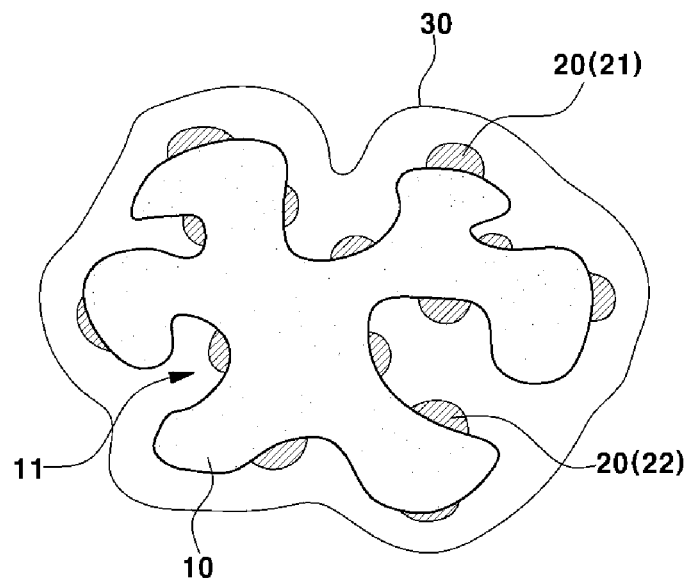
FIG. 3A is a view schematically showing a composite of a catalyst included in catalyst slurry manufactured according to the present disclosure and an ionomer.
Figure 3B:
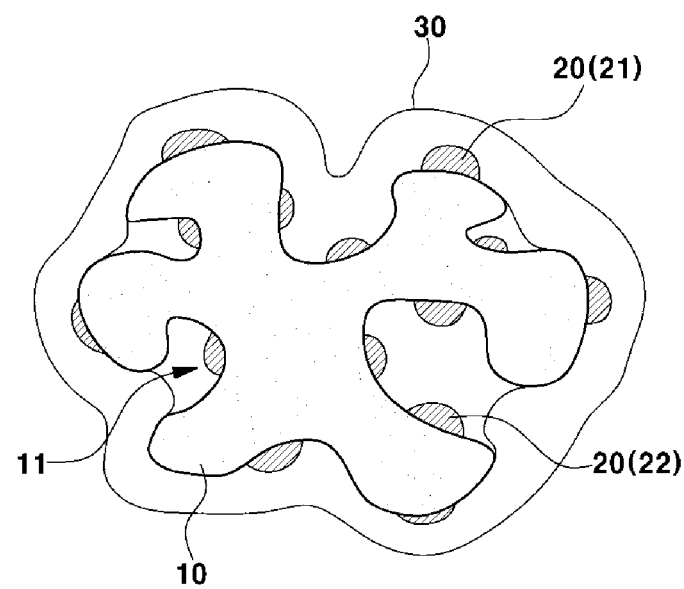
FIG. 3B is a view schematically showing a composite of a catalyst included in catalyst slurry manufactured using a conventional method and an ionomer.

FIG. 3A is a view schematically showing a composite of a catalyst included in catalyst slurry manufactured according to the present disclosure and an ionomer. Meanwhile, FIG. 3B is a view schematically showing a composite of a catalyst included in catalyst slurry manufactured using a conventional method and an ionomer.

Referring to FIG. 3A, it can be seen that, for the composite according to the present disclosure, the ionomer 30 is infiltrated into the pores 11 of the carrier 10 and contacts the catalyst metal 22 coupled to the inner surfaces of the pores 11. In contrast, it can be seen from FIG. 3B that the ionomer 30 is not infiltrated into the pores 11 of the carrier 10, whereby it is not possible to use the catalyst metal 22 coupled to the inner surfaces of the pores 11.

According to the present disclosure, therefore, it is possible to use both the catalyst metal 21 coupled to the outer surface of the carrier 10 and the catalyst metal 22 coupled to the inner surface of each of the pores 11, thereby achieving higher efficiency in use of the catalyst than the conventional art.

A method of manufacturing an electrode for fuel cells according to the present disclosure includes coating the catalyst slurry manufactured as described above on a substrate to manufacture an electrode and drying the electrode.

The substrate may include release paper. Specifically, the substrate may include one selected from the group consisting of polyethylene naphthalate (PEN), polyethylene terephthalate (PET), polytetrafluoroethylene (PTFE), and a combination thereof.

The catalyst slurry may be coated using a screen printing method, a spray coating method, a coating method using a doctor blade, a gravure coating method, a deep coating method, a silk screen method, a painting method, or a coating method using a slot die.

The drying condition of the electrode is not particularly restricted. For example, the electrode may be dried at 100° C. to 200° C. for 5 minutes to 24 hours.

In addition, the electrode manufactured as described above may be coupled to an electrolyte membrane using a heating and pressing method in order to manufacture a membrane-electrode assembly (MEA).

As is apparent from the foregoing, in the case in which catalyst slurry is manufactured according to the present disclosure, an ionomer is infiltrated into pores in a carrier, and the ionomer contacts catalyst metal present in the pores, whereby it is possible to greatly improve efficiency in use of the catalyst metal.

The effects of the present disclosure are not limited to those mentioned above. It should be understood that the effects of the present disclosure include all effects that can be inferred from the foregoing description of the present disclosure.

The embodiments of the present disclosure have been described with reference to the accompanying drawings.

However, it will be apparent to those skilled in the art that the present disclosure may be embodied in specific forms other than those set forth herein without departing from the spirit and essential characteristics of the present disclosure. Therefore, the above embodiments should be construed in all aspects as illustrative and not restrictive.

The invention claimed is:

1. A method of manufacturing catalyst slurry for fuel cells, the method comprising:
    preparing a catalyst comprising a porous carrier and catalyst metal;
    introducing the catalyst, a solvent, and an ionomer into a chamber; and
    infiltrating the ionomer into pores of the carrier;
    wherein the carrier comprises pores depressed inward from an outer surface of the carrier, the pores comprising a plurality of pore inlets each having an average diameter of 5 nm to 30 nm;
    wherein the ionomer comprises a polymer having a radius of gyration of a polymer chain of 5 nm or less;
    wherein the infiltrating of the ionomer into pores of the carrier comprises stirring contents of the chamber while applying heat and pressure thereto;
    wherein a temperature of the contents of the chamber is increased to 25° C. to 80° C.; and
    wherein the pressure applied to the contents of the chamber is 2 bar to 200 bar.

2. The method according to claim 1, wherein the carrier comprises one selected from a group consisting of graphite, active carbon, carbon black, carbon nanotube, carbon nanofiber, carbon nanowire, and a combination thereof.

3. The method according to claim 1, wherein the catalyst metal comprises:
    platinum (Pt); or
    at least one or an alloy of two or more selected from a group of platinum (Pt), iridium (Ir), ruthenium (Ru), palladium (Pd), nickel (Ni), cobalt (Co), and yttrium (Y).

4. The method according to claim 1, wherein the catalyst is introduced into the chamber, negative pressure is applied to the chamber, and the solvent and the ionomer are introduced into the chamber together with inert gas.

5. The method according to claim 1, wherein the solvent comprises one selected from a group consisting of distilled water, ethanol, propanol, butanol, ethylene glycol, and a combination thereof.

6. The method according to claim 1, wherein the ionomer comprises:
    a fluorine-based resin comprising a single polymer, a cross-linking polymer, a graft polymer, a copolymer, or a blend of one or more selected from a group consisting of perfluorosulfonic acid and perfluorocarboxylic acid;
    a non-fluorine-based resin comprising a single polymer, a cross-linking polymer, a graft polymer, a copolymer, or a blend of one or more selected from a group consisting of polyarylene ether, polyether ketone, polyether ether ketone, polyether sulfone, polyether ether sulfone, polyazole, polyvinyl alcohol, polyphenylene oxide, polyphenylene sulfide, polysulfone, polycarbonate, polystyrene, polyimide, polyamide, polyquinoxaline, and polybenzimidazole; and
    a combination thereof.

7. The method according to claim 1, wherein inert gas is introduced into the chamber in order to apply the pressure to the contents of the chamber.

8. The method according to claim 1, wherein the contents of the chamber are stirred for 24 hours to 48 hours.

9. The method according to claim 1, wherein the catalyst metal is coupled to an outer surface of the carrier and to an inner surface of each of the pores, and
    the ionomer is infiltrated into the pores of the carrier and contacts catalyst metal coupled to the inner surface of each of the pores of the carrier.

10. A method of manufacturing an electrode for fuel cells comprising coating the catalyst slurry manufactured using the method according to claim 1 on a substrate to manufacture the electrode.

11. The method according to claim 10, wherein the substrate is release paper comprising one selected from a group consisting of polyethylene naphthalate (PEN), polyethylene terephthalate (PET), polytetrafluoroethylene (PTFE), and a combination thereof.

12. The method according to claim 10, wherein the catalyst slurry is coated using a screen printing method, a spray coating method, a coating method using a doctor blade, a gravure coating method, a deep coating method, a silk screen method, a painting method, or a coating method using a slot die.

13. The method according to claim 10, further comprising drying the electrode at 100° C. to 200° C. for 5 minutes to 24 hours.

* * * * *